US006532229B1

United States Patent
Johnson et al.

(10) Patent No.: US 6,532,229 B1
(45) Date of Patent: Mar. 11, 2003

(54) LOW COST LINK AGGREGATION METHOD AND SYSTEM

(76) Inventors: Brian Weatherred Johnson, 23 Manor La., Lucas, TX (US) 75002; Steve H. S. Kim, 344 Concho Dr., Fremont, CA (US) 94539; Edward James Leo, Jr., 444 Saratoga Ave., Santa Clara, CA (US) 95050; Dennis Lee, 18373 Swarthmore Dr., Saratoga, CA (US) 95070

( * ) Notice: Subject to any disclaimer, the term of this patent is extended or adjusted under 35 U.S.C. 154(b) by 0 days.

(21) Appl. No.: 09/231,967

(22) Filed: Jan. 15, 1999

(51) Int. Cl.[7] .............................................. H04L 12/28
(52) U.S. Cl. ...................................... 370/351; 370/238
(58) Field of Search ................................ 370/237, 238, 370/248, 252, 395, 397, 399, 409, 411, 351

(56) References Cited

U.S. PATENT DOCUMENTS

| | | | | |
|---|---|---|---|---|
| 5,291,477 A | * | 3/1994 | Liew | .......................... 370/238 |
| 5,414,701 A | * | 5/1995 | Shtayer et al. | ............... 370/395 |
| 5,568,475 A | * | 10/1996 | Doshi et al. | ................ 370/58.2 |
| 5,953,338 A | * | 9/1999 | Ma et al. | ..................... 370/395 |
| 6,212,184 B1 | * | 4/2001 | Venkatachary et al. | ..... 370/392 |

* cited by examiner

*Primary Examiner*—Wellington Chin
*Assistant Examiner*—Brenda Pham
(74) *Attorney, Agent, or Firm*—Volentine Francos, PLLC

(57) ABSTRACT

A communication path selection method for sending a message between a sending communication device and a receiving communication device in a communication network includes a link aggregation group bitmap, identifying all communication paths belonging to a link aggregation group, and a trial destination bitmap, identifying all communication paths identified as trial destination paths by a routing mechanism in the sending communication device. The link aggregation group communication paths are compared to the trial destination communication paths and if at least one path belongs to both groups, a path selection table is enabled to provide a path number identifying the selected communication path by which the message is to be sent.

15 Claims, 2 Drawing Sheets

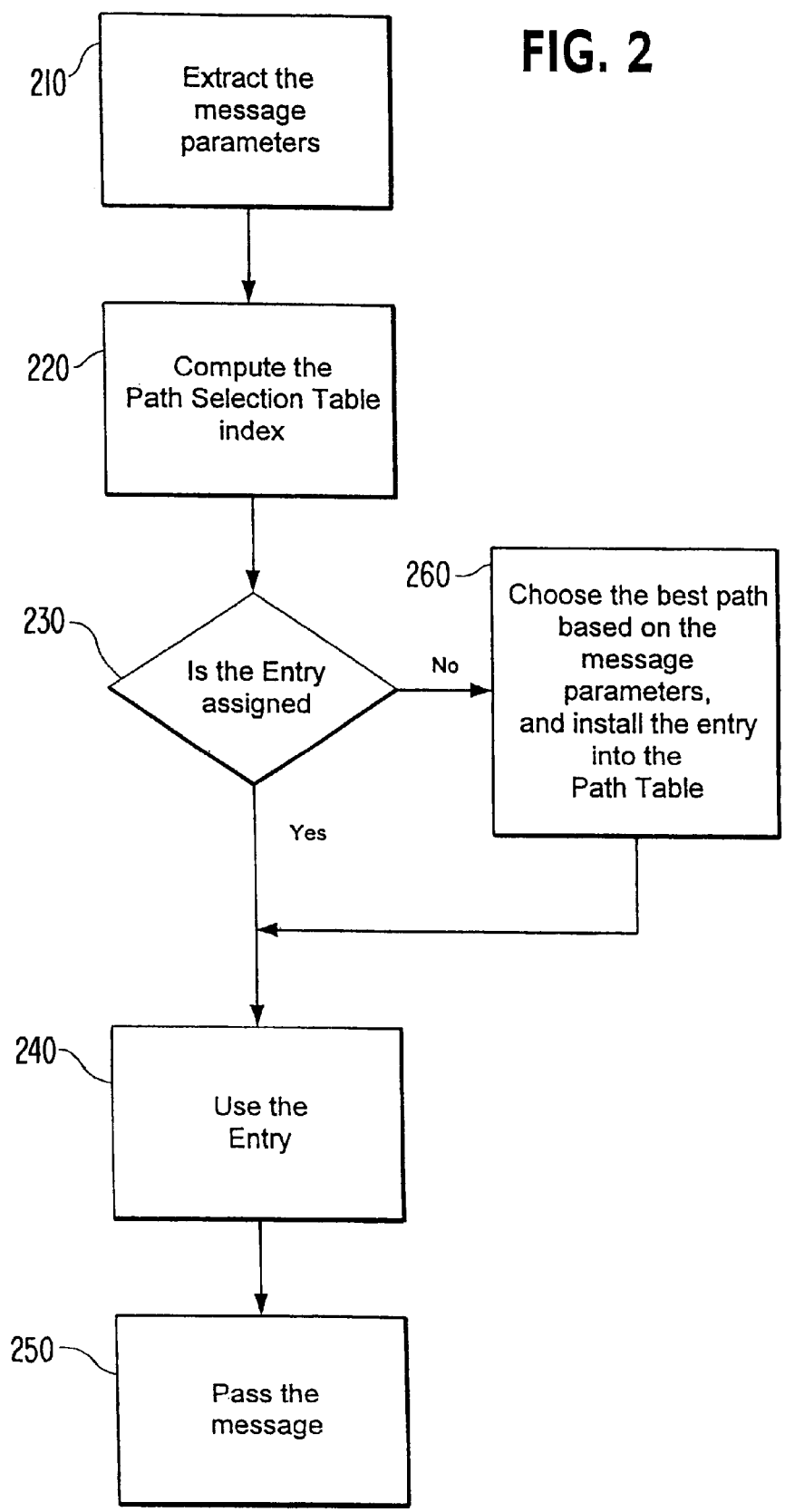

LOW COST LINK AGGREGATION METHOD AND SYSTEM

BACKGROUND OF THE INVENTION

1) Field of the Invention

This invention pertains to the field of communication networks, and, more specifically, to a method of link aggregation and selecting communication paths for communicating messages between a sending communication device and a receiving communication device in a communication network.

2) Description of the Related Art

Link aggregation is a method of communication used between communication devices whereby multiple communication paths are set up between pairs of such communication devices. Multiple communication paths are used to (1) provide more bandwidth than one such path can provide, or (2) to provide redundancy so that communication can continue even when some (but not all) of the paths are nonfunctional, or (3) both.

Messages are passed between two such communication devices. One device is the sending device; the other is the receiving device. Each message is passed from the sending communication device to the receiving communication device via one of the multiple aggregated communication paths.

For each message that must pass between the two communication devices, the sending communication device must choose one of the communication paths connecting the sending communication device to the receiving communication device.

Two examples of particular communication devices for which this technique of link aggregation is useful are (1) an Ethernet switching bridge, and (2) a router. In these cases, the communication paths might be Ethernet links, which might be implemented using coaxial cable, copper wire pair technology, optical fiber, or radio links. However, the technique is generally applicable to other types of devices, and other types of communication paths.

Also, the same technique can be used independently between multiple pairs of communication devices simultaneously, including the case where a single communication device simultaneously participates in multiple sets of multiple communication paths. The same technique is also useful for link methods other than Ethernet including, for example, fiber distributed data interface (FDDI), integrated services digital network (ISDN), asynchronous transfer mode (ATM), and X.25.

For each message that must pass between the two communication devices, the sending communication device must choose one of the communication paths connecting the sending communication device to the receiving communication device. In some cases, the message may be "multicast," or delivered to multiple destination receiving devices. Selection of a communication path should be made with due consideration of any or all of the following factors:

A link aggregation group is a group of data paths, all of which link a sending communication device to a single receiving communication device, and any given message between the two devices on the aggregated group of data paths should be transmitted via exactly one of the paths.

None, some, or all of the outbound paths of the sending communication device may be members of a link aggregation group. A link aggregation method should affect only destination decisions which are part of the link aggregation group; it does not affect the other destination decisions.

There may be multiple link aggregation groups, each group being connected to a distinct receiving communication device. The link aggregation methodology is applied independently to multiple aggregation groups.

It is desirable to support the methodology at low cost, even in "dumb" communication devices. A "dumb" communication device is one that does not provide a "management" computer. Configuration of such "dumb" devices is typically done using DIP switches or the like, rather than communicating with the device as a networked computer, or using a connected terminal. In this case, it is desirable that the configuration of the link aggregation group(s) be capable of being done in this low cost manner.

Some of the multiple communication paths may be temporarily nonfunctional.

The communication paths may be non-homogeneous, with some paths providing higher bandwidth than others.

Some communication paths may be more heavily utilized than others, and for a given message it may be desirable to choose a path based on communication path availability. This is a form of load balancing.

The communication paths may have different propagation speeds, and it may be desirable for related messages (e.g., part of a same "conversation") to be passed over the same communication path to preserve the order of the messages.

The last factor is of particular interest, because there are many communication devices that either require this characteristic, or that operate more efficiently when the communication has this characteristic.

Previous approaches to solving this problem have relied on the use of dedicated microprocessors to configure and operate the link aggregation communication path selection mechanism. Such approaches are expensive.

Previous approaches to solving this problem have not handled unreliable links well. They have chosen the path statically, and therefore could not avoid failed paths.

Accordingly, it would be advantageous to provide for the configuration and operation of a link aggregation mechanism that does not require the use of dedicated software-based computing facilities. It would further be advantageous to provide a mechanism which considers all of the factors listed above. Other and further objects and advantages will appear hereinafter.

SUMMARY OF THE INVENTION

The present invention comprises a system and method of link aggregation and path selection in a communication network comprising a sending communication device, a receiving communication device, and a plurality of communication paths from the sending communication device to the receiving communication device.

In one aspect of the invention, a link selector compares members of a link aggregation group with a list of trial destination communication paths produced by a routing mechanism in the communication device. If one of the trial destination communication paths is a member of the link aggregation group, then one of the members of the link aggregation group is selected for sending a message to the receiving communication device. The selected path might not be the same as the one listed in the trial bitmap.

In another aspect of the invention, the selected communication path is identified by a path number produced by a path selection table in the sending communication device.

Message parameters from the message are processed to generate an index into the path selection table. The index contains an entry with a path number identifying one of the communication paths between the sending communication device and the receiving communication device. The message is sent to the receiving communication device via the communication path corresponding to the path number produced by the path selection table.

In yet another aspect of the present invention, trial destination communication paths which are not members of the link aggregation group are independently enabled for sending the message.

BRIEF DESCRIPTION OF THE DRAWINGS

FIG. 2 is a flowchart of a method of link aggregation and communication path selection.

DESCRIPTION OF THE PREFERRED EMBODIMENTS

Figure 1:
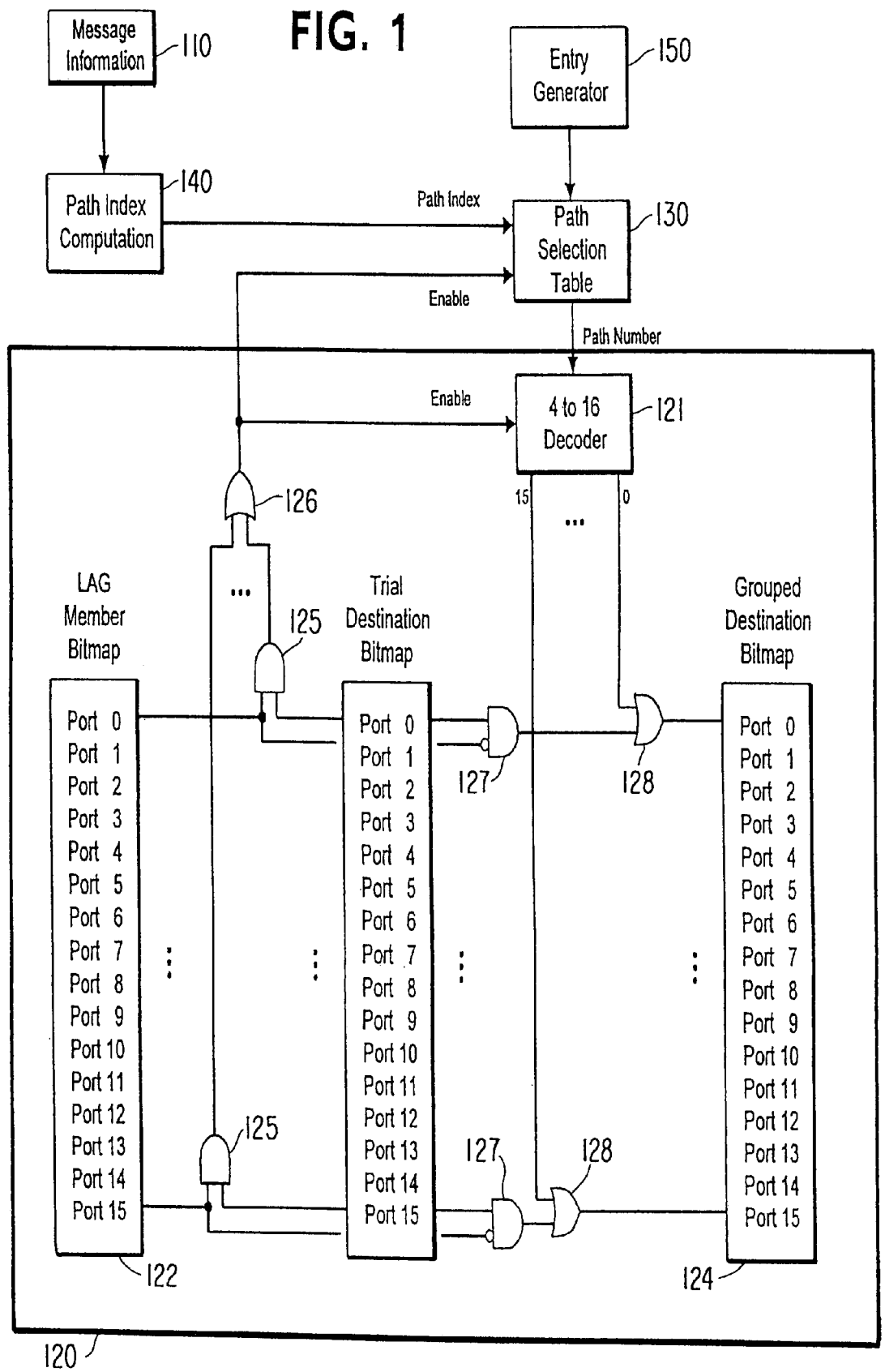
FIG. 1 is a block diagram showing components of a preferred embodiment of path selector in a transmitting communication device according to the present invention

Embodiments and other aspects of the invention described herein, including the system embodiments described below, may be made or used in conjunction with inventions described, in whole or in part, in commonly assigned co-pending U.S. patent application Ser. No. 09/231,968 filed on Jan. 15, 1999 in the name of inventors Brian Johnson, Steve Kim, Edward Leo, Jr. and Dennis Lee, entitled "LINK AGGREGATION PATH SELECTION METHOD" "(Attorney docket No. SDY.003) which is hereby incorporated by reference for all purposes as if fully set forth herein.

FIG. 1 shows a prefered embodiment of a path selector in a sending communication device which performs the transmission side of link aggregation according to a one or more aspects of the present invention. The exemplary embodiment of FIG. 1 illustrates a sending communication device having N=16 (sixteen) communication paths.

The sending communication device includes a message source 110. The messages may either be received from somewhere else to be forwarded, or they may be generated from within the sending communication device.

The message source 110 passes messages to one or more communication ports in the sending communication device. For example, the message source 110 may store the messages in a message buffer in the communication device. Each communication port may then access messages from message source 110 via the message buffer according to a list of message addresses stored in a FIFO associated with each port. In that case, the path selector may select a communication port to transmit a particular message by storing in that port's FIFO a pointer to the particular message. Other methods of message access and transmission are possible, with the path selector selecting the selected communication port(s) for transmitting each message.

The path selector 120 operates according to one or more aspects of the present invention. The path selector selects among "N" possible communication paths for sending each message between the sending communication device and a receiving communication device in the communication network. The path selector 120 responds to a communication path selection signal from a path selection table 130 which identifies a communication path for the message to be transmitted as will be described more fully below.

Meanwhile, information containing relevant parameters from each message supplied to the path selector 120 is also supplied to an index generator 140. Such information may be located in a message header, for example. As discussed above, communication paths may have different propagation speeds, and it may be desirable for related messages to be passed over the same path to preserve the order of the messages. Accordingly, the information which is passed to the index generator 140 identifies a "conversation" of which the message is a part. This ensures that successive messages belonging to a same conversation are transmitted via the same path, to preserve the order of the messages. The information used to compute the index from the message information (to identify the "conversation") can be anything suitable for the communication device technology. For instance, for an Ethernet device, the index computation could be based on the source MAC address, the destination MAC address, and perhaps the Virtual LAN identification, if any. A higher level routing device could use information taken from deeper within the message, e.g., the IP addresses of the correspondents. For media types other than Ethernet, some other information that identifies the "conversation" could be used to compute the index. For virtual circuit technologies, the virtual circuit number would suffice. From this information, the index generator 140 computes an index into a path selection table 130. The computed index must be within the range [1. . . K] of the path selection table 130.

The path selection table 130 contains "K" entries, each of which can either specify a particular communication path, or can be unassigned. Each entry can be accessed using a unique index value. Each entry which is assigned contains a path number which specifies the appropriate communication path for any message for which the corresponding index is computed by the index generator 140. Each unassigned entry does not specify a communication path, and the entry must become assigned before any message resulting in that index can be transmitted. Assigned entries contain a path number which must have a value in the range [1. . . N], matching the "N" communication paths available to the path selector 120. In order for all of the communication paths to be simultaneously usable, K must be equal to, or greater than, N. The size of the path selection table 130 affects the degree to which the communication paths can be optimally utilized. Using large values of K increases the likelihood that the index determination for unrelated messages will result in distinct computed indices. Distinct computed indices permit separate communication path selection decisions, and separate communication path selection decisions permit better load balancing.

An entry generator 150 generates an entry for the path selection table 130 when an index computed for the message selects an unassigned entry in the path selection table. This generation is performed with due consideration of the factors which are important to the application, including those listed above in the "Background." This component may operate in whole or in part according to a method disclosed in the previously mentioned U.S. patent application Ser. No. 09/231,968, "LINK AGGREGATION PATH SELECTION METHOD".

The path selector 120 comprises a decoder 121, a link aggregation group (LAG) member bitmap register 122, a trial destination bitmap register 123, a grouped destination bitmap register 124, and logic circuits 125, 126, 127 and 128. The path selector 120 determines a bitmap for transmission of each message based on the path selection register, the trial bitmap register, and the link aggregation configuration in the LAG member bitmap register. Operation of the path selector 120 will now be described more fully.

The LAG member bitmap register 122 contains one bit for each communication path that is associated with the sending communication device. For each communication path, bits that are set to "1" indicate that the communication path is a member of the link aggregation group.

The trial destination bitmap register 123 contains the proposed destination bitmap generated by a proposed destination algorithm executed by a message router in the sending communication device. For example, the sending communication device may be a switching bridge. In that case, the sending communication device may execute a spanning tree protocol, as is known in the art, in support of generating the proposed destination bitmap. Multiple bits in the trial destination bitmap register 123 may be set to "1", each indicating that the message should be sent to that destination communication device according to the proposed destination algorithm. Multiple bits can be set when the message is to be "multicast" to multiple destinations.

The grouped destination bitmap register 124 contains the final destination bitmap determined after operation of the link aggregation method. Multiple bits may be set to "1", each indicating that the message should be sent via each of the indicated communication paths. Multiple bits can be set when the message is to be "multicast" via multiple communication paths.

The decoder and associated logic operate as follows. When a message is available for transmission, a trial bitmap is produced for the message by a routing mechanism of the communication device, the operation of which is not part of the subject of this invention. The trial bitmap is loaded into the trial destination bitmap register 123, and can have multiple bits set, each representing a destination to which the message is to be sent.

Meanwhile the LAG member bitmap register 122 identifies the destination communication paths which are members of the link aggregation group. Each bit set to a "one" identifies a member communication path; each bit set to a "zero" identifies a nonmember communication path. This register can represent, for example, the configuration of "DIP" switches if the communication device is "unmanaged" (low cost), or it can be a register initialized by a processor if the communication device is "managed".

The method uses logic (e.g., logic circuitry 125 and 126) to determine whether any bits set in the trial destination bitmap register 123 correspond to bits set in the LAG member bitmap register 122. If any such correspondence is detected, then the path selection table 130 (and the supporting mechanisms) is invoked to determine which one of the communication paths corresponding to the link aggregation group is to be enabled in the grouped destination bitmap register 124. Exactly one member communication path from the link aggregation group is enabled.

In a preferred embodiment, when enabled by the logic associated with the trial destination bitmap register and the LAG member bitmap register, the path selection table 130 outputs a path number corresponding to a table entry accessed using the index value computed by the index generator 140. In a preferred embodiment, a decoder 121 receives the path number as a binary coded word in BASE-2 format and decodes it to provide "N" decoded output lines corresponding to the N communication paths available to the path selector 120. One of the decoded output lines is set to "one" to denote the selected communication path for the message. Alternatively, the path selection table 130 could provide a decoded output with N lines, one for each of the N communication paths, in which case the decoder 121 could be replaced with a simple register. Logic circuitry 127 passes all bits in the trial destination bitmap register 123 which are not members of the link aggregation group such that these paths are activated in the grouped destination bitmap register 124 independent of the operation of the link aggregation method and system of the present invention. Logic circuitry 128 operates to additionally set one LAG member bit (as determined by the enabled decoder 121) in the grouped destination bitmap register 124.

It should be noted that in the case of sixteen communication paths described in this preferred embodiment, logic circuitry 125, 127, and 128 is required for each of the sixteen paths. This is indicated with the ellipses ". . ." in FIG. 1. Likewise, the logic circuitry 126 has sixteen inputs, also indicated by the ellipses ". . ." in FIG. 1.

If no such correspondence is detected between bits set in the trial destination bitmap register 123 and bits set in the LAG member bitmap register 122, then decoder 121 is not enabled, so none of the LAG member communication paths is enabled in the grouped destination bitmap register 124. Any bits set in the trial destination bitmap register 123 that do not correspond to set bits set in the LAG member bitmap register 123 are enabled in the grouped destination bitmap register 124 without alteration. Those destination choices are not affected by the link aggregation method of the present invention.

Finally, the bitmap output from the grouped destination bitmap register 124 determines which communication ports transmit the message. For example, as discussed above, each bit in the register 124 may identify one FIFO associated with one communication port. In that case, the bitmap identifies one or more FIFO(s) wherein a pointer to the message's address in a message buffer is to be stored, such that the associated communication port may thereby transmit the message.

A flowchart for a preferred embodiment of a communication path selection method is shown in FIG. 2. This methodology inherently preserves the transmission sequence of all messages having the same computed index, by passing all such messages via the same communication path. Accordingly, all messages belonging to a same conversation arrive at the destination communication device in the proper sequence.

In a step 210, when a message is to be transmitted, parameters are extracted to compute an associated index. Next, in a step 220, the associated index is computed. The index is used to select the associated entry in the path selection table 130.

In a step 230, it is determined whether or not the computed index has been assigned an entry. If the entry is assigned, then in a step 240 the assignment is given to the path selector 120. Finally, in a step 250, the message is transmitted using the selected communication path.

If the entry is not assigned, then in a step 260 the entry generator 150 must generate and install a new entry into the path selection table 150 before the message is transmitted. Once this has been done, then the message can be transmitted as it would have been had the entry already been assigned.

While preferred embodiments are disclosed herein, many variations are possible which remain within the concept and scope of the invention. For example, multiple link aggregation groups can be simultaneously supported, either by partitioning the communication paths, or by cascading the path selection mechanism. The LAG member bitmap register is the only thing that must be configured for link aggregation, and is therefore suitable for direct configuration using switches, or the like. No computer is required.

Accordingly, the techniques disclosed are suitable for direct implementation in low cost hardware. Such variations would become clear to one of ordinary skill in the art after inspection of the specification, drawings and claims herein. The invention therefore is not to be restricted except within the spirit and scope of the appended claims.

What is claimed is:

1. A method of selecting a selected communication path, from among a plurality of communication paths, for sending a message from a sending communication device to a receiving communication device, comprising:

determining a first subset of said communication paths defining members of a link aggregation group;

determining a second subset of said communication paths defining trial destination communication paths;

selecting as said selected communication path a one of said trial destination communication paths which is a member of said link aggregation group, wherein selecting as said selected communication path a one of said trial destination paths which is a member of said link aggregation group, comprises:

extracting message information from said message;

using said message information to generate a communication path number for transmission of said message; and selecting as said selected communication path a communication path which corresponds to said communication path number.

2. The method of claim 1, wherein using said message information to generate a communication path number for transmission of said message, comprises:

using said message information to compute an index into a path selection table;

outputting from said path selection table an entry assigned to said index comprising said communication path number.

3. A path selector in a link aggregation system, comprising:

a link aggregation bitmap register comprising a first plurality of bits each corresponding to one of a plurality of communication paths;

a trial destination bitmap register comprising a second plurality of bits each corresponding to said one of a plurality of communication paths;

a grouped destination bitmap register comprising a third plurality of bits each corresponding to said one of a plurality of communication paths;

first logic for comparing said first plurality of bits and said second plurality of bits and providing an enable signal, said enable signal having a first state when at least one of said first bits and said second bits corresponding to a same one of said communication paths are each set, and having a second state when none of said first bits and said second bits corresponding to the same one of said communication paths are each set;

selected communication path signal outputting means for receiving a path number signal, indicating a one of said plurality of communication paths to be selected, and for receiving said enable signal, and in response thereto outputting a selected communication path signal when said enable signal has the first state; and second logic for receiving said selected communication path signal and in response thereto setting one of said plurality of bits in said grouped destination bitmap register corresponding to said one of said communication paths to be selected.

4. The path selector of claim 3, wherein said selected communication path signal outputting means comprises a decoder which decodes said path number signal to produce said selected communication path signal.

5. The path selector of claim 3, wherein said selected communication path signal outputting means comprises a register.

6. The path selector of claim 3, wherein said second logic compares the first plurality of bits and the second plurality of bits, and in response thereto sets a bit in said grouped destination bitmap register corresponding to one of said communication paths when one of said second bits corresponding to the same one of said communication paths is set while one of said first bits corresponding to the same one of said communication paths is not set.

7. The path selector of claim 3, wherein said second logic sets a second one of said plurality of bits in said grouped destination bitmap register corresponding to a communication path having a corresponding one of the second plurality of bits set in the trial destination bitmap register and having a corresponding one of the first plurality of bits not set in the link aggregation bitmap register.

8. In a communication network comprising a sending communication device, a receiving communication device, and a plurality of communication paths between said sending communication device and said receiving communication device, a method of selecting a selected communication path, from among said plurality of communication paths, for sending a message to the receiving communication device, comprising:

setting one or more first bits, corresponding to a first subset of said communication paths defining members of a link aggregation group, in a link aggregation group bitmap register setting one or more second bits, corresponding to a second subset of said communication paths defining trial destination communication paths, in a trial destination bitmap register;

comparing said first bits and said second bits to determine if one of said communication paths belongs to both said first subset and said second subset; and in response to one of said communication paths being a member of both said first subset and said second subset, setting a bit, corresponding to said selected communication path, among a plurality of third bits in a grouped destination bitmap register, said selected communication path belonging to both said first subset and said second subset.

9. The method of claim 8, further including:

selecting at least one second selected communication path by setting a second bit, corresponding to said second selected communication path, among said plurality of third bits in said grouped destination bitmap register, wherein said second selected communication path belongs to said second subset, but does not belong to said first subset.

10. The method of claim 8, wherein setting a bit corresponding to said selected communication path, comprises:

extracting message information from said message;

using said message information to generate a communication path number for transmission of said message; and setting said bit among said plurality of third bits in the grouped destination bitmap register, wherein said bit corresponds to said communication path number.

11. The method of claim 8, further comprising, in response to said one of said communication paths being a member of both said first subset and said second subset, enabling a path selection table to generate a communication path number corresponding to the selected communication path.

12. A method of selecting a selected communication path, from among a plurality of communication paths, for sending a message from a sending communication device to a receiving communication device, comprising:

determining a first subset of said communication paths defining members of a link aggregation group;

determining a second subset of said communication paths defining trial destination communication paths;

selecting as said selected communication path a one of said trial destination communication paths which is a member of said link aggregation group, wherein selecting as said selected communication path a one of said third subset of communication paths which corresponds to said communication path number comprises:

comparing the first subset and the second subset to determine whether any members of the first subset are also members of the second subset; and when at least one member of the first subset is also a member of the second subset, enabling a path selection table to generate a communication path number corresponding to the selected communication path.

13. The method of claim 12, wherein selecting as said selected communication path a one of said third subset of communication paths which corresponds to said communication path number further comprises:

extracting message information from said message;

using said message information to compute an index into the path selection table; and generating the communication path number corresponding to the selected communication path according to an entry assigned to the index.

14. A method of selecting a selected communication path, from among a plurality of communication paths, for sending a message from a sending communication device to a receiving communication device, comprising:

determining a first subset of said communication paths defining members of a link aggregation group;

determining a second subset of said communication paths defining trial destination communication paths;

selecting as said selected communication path a one of said trial destination communication paths which is a member of said link aggregation group, wherein determining the second subset of said communication paths defining trial destination communication paths includes executing a spanning tree protocol.

15. A method of selecting a selected communication path, from among a plurality of communication paths, for sending a message from a sending communication device to a receiving communication device, comprising:

determining a first subset of said communication paths defining members of a link aggregation group;

determining a second subset of said communication paths defining trial destination communication paths;

selecting as said selected communication path a one of said trial destination communication paths which is a member of said link aggregation group, further including comparing the first subset of communication paths to the second subset of communication paths to identify a third subset of communications paths which commonly belong to both the first and second subsets.

* * * * *